(12) United States Patent
Xiao et al.

(10) Patent No.: US 12,266,386 B2
(45) Date of Patent: Apr. 1, 2025

(54) DATA STORAGE DEVICE WITH RAPID IN-FIELD REPEATABLE RUNOUT NOISE REMOVAL CALIBRATION

(71) Applicant: WESTERN DIGITAL TECHNOLOGIES, INC., San Jose, CA (US)

(72) Inventors: Sandy Xianghui Xiao, San Diego, CA (US); Noureddine Kermiche, Dana Point, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 54 days.

(21) Appl. No.: 18/232,031

(22) Filed: Aug. 9, 2023

(65) Prior Publication Data

US 2024/0290348 A1    Aug. 29, 2024

Related U.S. Application Data

(60) Provisional application No. 63/447,798, filed on Feb. 23, 2023.

(51) Int. Cl.
G11B 5/55 (2006.01)
G11B 5/60 (2006.01)
G11B 20/24 (2006.01)

(52) U.S. Cl.
CPC .......... *G11B 5/5586* (2013.01); *G11B 5/6029* (2013.01); *G11B 20/24* (2013.01)

(58) Field of Classification Search
None
See application file for complete search history.

(56) References Cited

U.S. PATENT DOCUMENTS

| | | |
|---|---|---|
| 6,700,724 B2 | 3/2004 | Riddering et al. |
| 6,826,006 B1 | 11/2004 | Melkote et al. |
| 7,016,139 B2 | 3/2006 | Baumgart et al. |
| 2005/0270684 A1 | 12/2005 | Baumgart et al. |
| 2008/0218895 A1 | 9/2008 | Scura et al. |
| 2008/0316637 A1 | 12/2008 | Zhu et al. |
| 2010/0238588 A1 | 9/2010 | Drouin et al. |

(Continued)

OTHER PUBLICATIONS

M. Kawafuku et al., "Rejection of repeatable runout for HDDs using adaptive filter," The 8th IEEE International Workshop on Advanced Motion Control, 2004. AMC '04., Kawasaki, Japan, 2004, pp. 305-310, doi: 10.1109/AMC.2004.1297685.

(Continued)

*Primary Examiner* — Craig A. Renner
(74) *Attorney, Agent, or Firm* — Calderon Safran & Wright P.C.

(57) ABSTRACT

Various aspects are directed to a data storage device comprising one or more disks, an actuator mechanism configured to position a selected head among one or more heads proximate to a corresponding disk surface among the one or more disks, and one or more processing devices. The one or more processing devices are configured to detect repeatable runout (RRO) noise components from a measurement of fly height of the selected head above one or more sectors of a fly height measurement track, and remove the detected RRO noise components from one or more per-sector readback signal measurements.

20 Claims, 7 Drawing Sheets

(56) References Cited

U.S. PATENT DOCUMENTS

2011/0013305 A1\*  1/2011  Ehrlich et al. ....... G11B 5/6005
                                                        360/31
2011/0157736 A1   6/2011  Contreras et al.

OTHER PUBLICATIONS

A. Murthy et al., "In-Situ Contact Potential Measurement in Hard Disk Drives Using Head Disk Interface Voltage Control." Proceedings of the ASME 2014 Conference on Information Storage and Processing Systems. 2014 Conference on Information Storage and Processing Systems. Santa Clara, California, USA. Jun. 23-24, 2014, 3 pages. V001T01A027. ASME. https://doi.org/10.1115/ISPS2014-6994.

\* cited by examiner

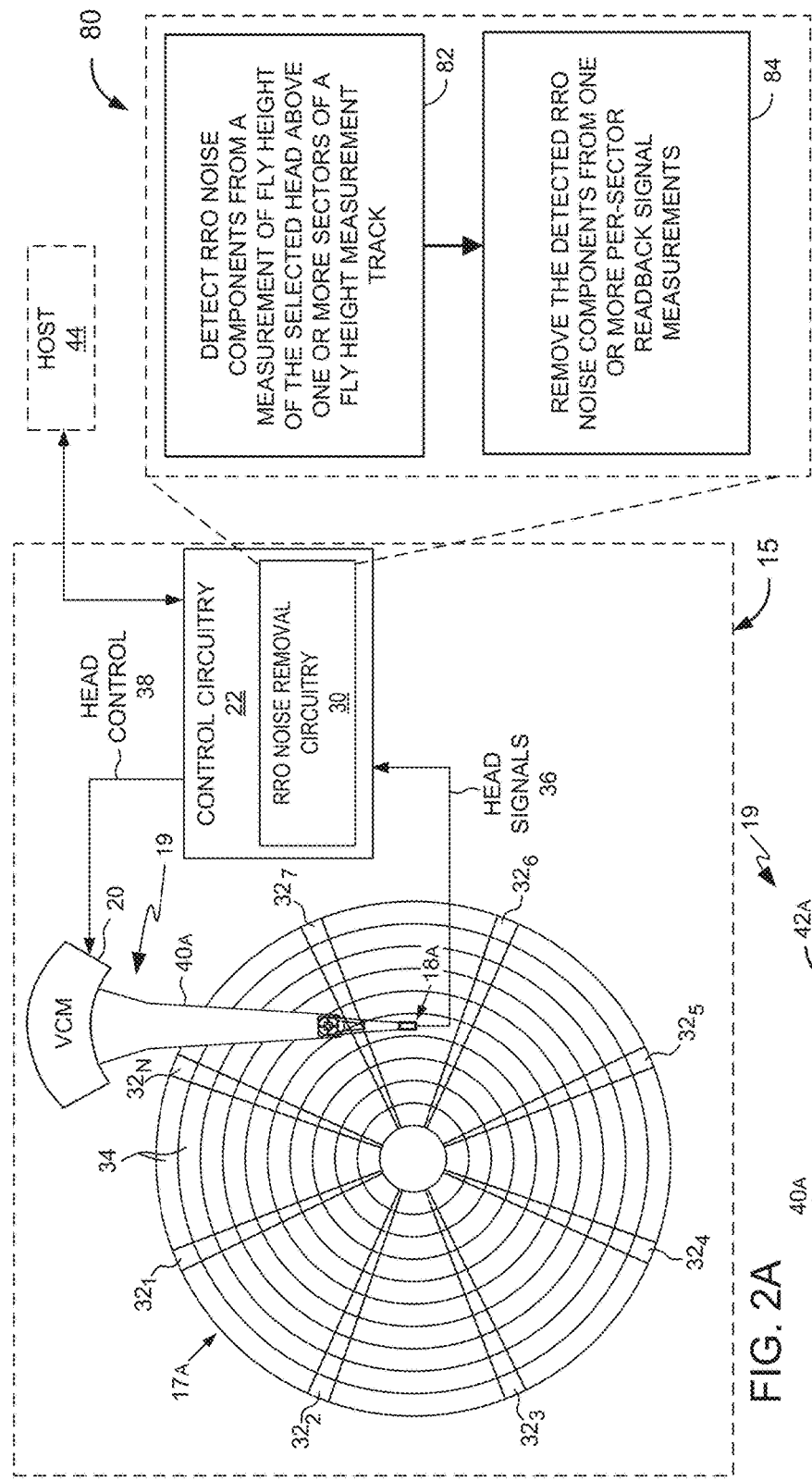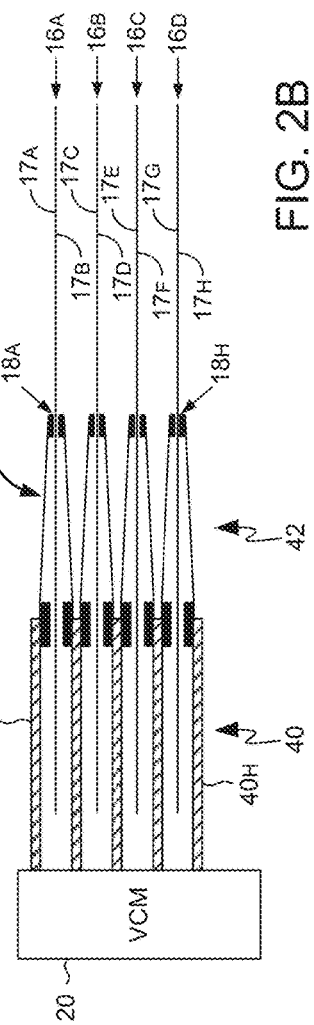

DATA STORAGE DEVICE WITH RAPID IN-FIELD REPEATABLE RUNOUT NOISE REMOVAL CALIBRATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_0$-$6_N$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more further actuators, such as milliactuators and microactuators, in some examples.

SUMMARY

Various examples disclosed herein provide data storage devices such as hard disk drives with systems, devices, methods, techniques, and control circuitry configured to perform novel and inventive removal of noise due to repeatable runout (RRO) for various types of readback signal measurements, in accordance with aspects of the present disclosure. In various examples, control circuitry of this disclosure is configured to detect RRO noise components from measuring fly height on a dedicated fly height measurement track, then use those RRO noise components detected from the fly height measurement track to subtract and remove RRO noise from various types of readback signal measurements, where per-sector ID (SID) measurement is required. As various examples, control circuitry of this disclosure may remove RRO noise from readback signal measurements for slider bias voltage (SBV), laser power, overwrite measurement, and magnetron sputter shadow amplitude, among others.

Control circuitry of this disclosure may use this removal of RRO noise from readback signal measurements for various types of advantageous functions. As one example, control circuitry of this disclosure may remove RRO noise from realtime slider bias voltage readback signal measurements, to perform realtime calculations of an optimum slider bias voltage and to perform fast, in-field calibration of slider bias voltage. In another example, control circuitry of this disclosure may remove RRO noise from laser power readback signal measurements in heat-assisted magnetic recording (HAMR) heads to achieve newly precise control of the lasers. In another example, control circuitry of this disclosure may remove RRO noise from overwrite measurement readback signal measurements to perform newly precise overwrite measurement. In another example, control circuitry of this disclosure may remove RRO noise from magnetron sputter shadow amplitude readback signal measurements to achieve new levels of precision in magnetron sputter thin film deposition in the disk drive manufacturing process.

Various illustrative aspects are directed to a data storage device, comprising one or more disks; an actuator mechanism configured to position a selected head among one or more heads proximate to a corresponding disk surface among the one or more disks; and one or more processing devices. The one or more processing devices are configured to detect repeatable runout (RRO) noise components from a measurement of fly height of the selected head above one or more sectors of a fly height measurement track, and remove the detected RRO noise components from one or more per-sector readback signal measurements.

Various illustrative aspects are directed to a method comprising detecting, by one or more processing devices, repeatable runout (RRO) noise components from a measurement of fly height of a selected head of a data storage device above one or more sectors of a fly height measurement track of a corresponding disk surface among one or more disks of the data storage device; and removing, by one or more processing devices, the detected RRO noise components from one or more per-sector readback signal measurements.

Various illustrative aspects are directed to one or more processing devices comprising means for detecting repeatable runout (RRO) noise components from a measurement of fly height of a selected head of a data storage device above one or more sectors of a fly height measurement track of a corresponding disk surface among one or more disks of the data storage device; and means for removing the detected RRO noise components from one or more per-sector readback signal measurements.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, including for detecting and removing RRO noise components from per-sector readback signal measurements, in accordance with aspects of the present disclosure.

DETAILED DESCRIPTION

Figure 1:
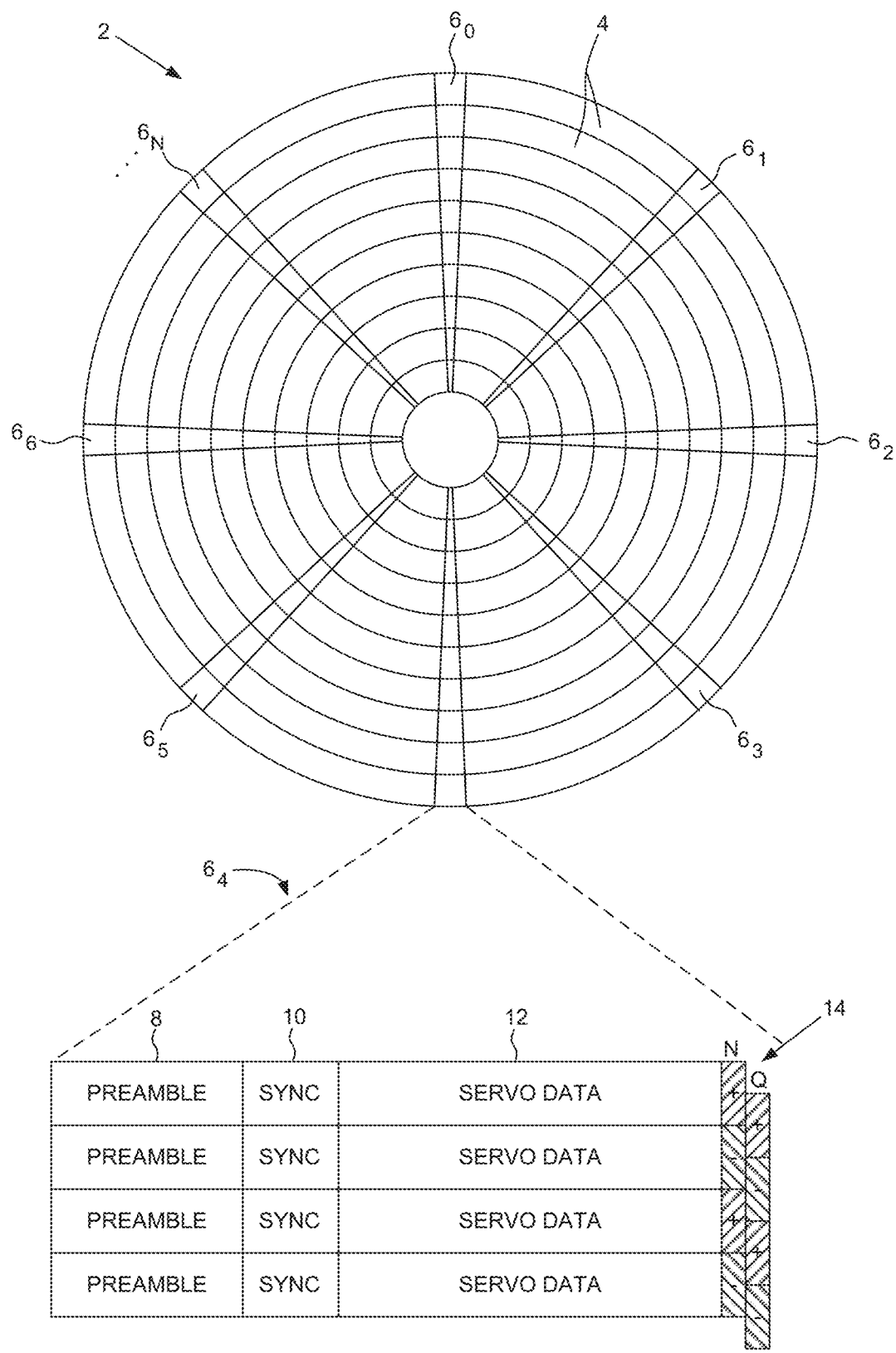
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises RRO noise removal circuitry 30. FIG. 2C depicts a flowchart for an example method 80 that RRO noise removal circuitry 30 of control circuitry 22 may perform in controlling the operations of disk drive 15, in accordance with aspects of the present disclosure. FIG. 2C depicts RRO noise removal circuitry 30 performing operations involved in detecting RRO noise components from measuring fly height on a dedicated fly height measurement track, then using those RRO noise components detected from the fly height measurement track to subtract and remove RRO noise from various types of readback signal measurements, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks, or other numbers of disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 outputted by the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, RRO noise removal circuitry 30 of control circuitry 22 may detect RRO noise components from a measurement of fly height of the selected head above one or more sectors of a fly height measurement track (82). RRO noise removal circuitry 30 may further remove the detected RRO noise components from one or more per-sector readback signal measurements (84). Control circuitry 22, including RRO noise removal circuitry 30, may further perform additional actions, methods, and techniques, in accordance with various aspects including as further described herein.

In various examples of this disclosure, systems, devices, methods, and techniques reduce RRO noise for various kinds of readback signal measurements, where the readback signal measurements are required on a per-sector ("per-SID") basis. One particular example of reducing RRO noise for readback signal measurements is discussed as follows in the context of reducing RRO noise for slider bias voltage control.

As disk drive technology advances, head to disk surface media spacing is getting increasingly close, and may be in the sub-nanometer range, in some examples. In a hard disk drive, spindle motor rotation and aerodynamic friction may induce gain or loss of electrons on disk surfaces 17 and generate non-negligible and variable electric charges on disk surfaces 17. Similarly, aerodynamic friction may generate non-negligible and variable electric charges on heads 18. The electrical charges on disk surfaces 17 and/or heads 18 may further cause induced electrical charges on each other. The variable electrical charges on heads 18 and disk surfaces 17 while heads 18 and disk surfaces 17 are in motion relative to each other cause varying electrical and magnetic forces between heads 18 and disk surfaces 17. Within a nominally short range of displacement, the magnetic forces may be ignored and the electrical forces between heads 18 and disk surfaces 17 may be modeled as electrostatic forces in accordance with Coulomb's law. Given charge inducement across the gaps between heads 18 and disk surfaces 17, the electrical force tends to be attractive. Disk drive circuitry 22 may apply a slider bias voltage signal so as to compensate for these varying and unpredictable electrical forces between heads 18 and disk surfaces 17, and cancel out their effects on fly height head-disk spacing ("fly height"), to maintain heads 18 at optimal or nominal fly height above or proximate to disk surfaces 17.

Disk drive circuitry 22 may apply a compensatory realtime slider bias voltage signal to control voltage on heads 18 to balance out the electrical forces between heads 18 and disk surfaces 17. Among the inventive insights of this disclosure, since the electrical forces can continue to vary unpredictably, due to varying factors such as changing temperature, this compensatory realtime slider bias voltage signal cannot fully compensate for the electrical forces unpredictably driving heads 18 away from optimal fly height, unless disk drive circuitry 22 performs fast, on-the-fly calibration of an optimal value of slider bias voltage to counteract up-to-date values of electrical attraction or repulsion between heads 18 and disk surfaces 17.

Disk drive circuitry 22 of this disclosure comprises RRO noise removal circuitry 30. RRO noise removal circuitry 30 enables fast, on-the-fly calibration of an optimal slider bias voltage (OSBV) to counteract up-to-date values of electrical force between heads 18 and disk surfaces 17. RRO noise removal circuitry 30 enables on-the-fly calibration of OSBV within one revolution or less of disks 16, in various examples, as further explained below. RRO noise removal circuitry 30 may be constituted of any one or more portions, configurations, or implemented functions of control circuitry 22 involved in performing any of the methods, techniques, and functions ascribed thereto herein, in various examples.

Slider bias voltage and fly height have approximately a second order relationship with each other within a nominally small voltage range. Within such a range, fly height relative to slider bias voltage may be modeled in accordance with the following equation:

$$FH = A*(SBV - OSBV)^2 + B \qquad \text{(Equation 1)}$$

where FH is fly height, SBV is slider bias voltage, OSBV is optimum slider bias voltage, and A and B are constants. When SBV is OSBV, electrical charge is canceled out, and the electrostatic force is zero. RRO noise removal circuitry 30 may seek to find this OSBV as part of in-field slider bias calibration.

Since slider bias voltage relative to fly height within a nominal range may be modeled as a second-order equation, an ideal curve-fitting of the relation could theoretically be performed with only three measurement data points of fly height relative to three corresponding values of SBV, though that would assume perfect measurement capability. Actual fly height measurements tend to be impacted by distortion and other noise. Measurement noise can often be so strong relative to the fly height signal that it can overwhelm the signal, and make it difficult to get accurate fly height measurements, and thus difficult to detect changes in fly height due to changes in SBV. Conventional methods of calibrating to address this difficulty of accurate fly height measurement have typically involved measuring fly height over many disk revolutions. However, measuring fly height over many disk revolutions takes a long time, and degrades performance for host command input/output (I/O).

Systems, devices, techniques, and methods of the present disclosure reduce the noise in any of various readback signal measurements where per-sector ID (per-SID) measurements are needed, and accurately determine parameters based on the de-noised readback signals. As one example, RRO noise removal circuitry 30 may reduce the RRO noise in fly height readback signal measurements and determine parameters such as the optimum slider bias voltage (OSBV) after only collecting data for no more than one disk revolution. RRO noise removal circuitry 30 thus performs an SBV calibration process much more rapidly than in conventional systems, and with much less impact on host command I/O.

Control circuitry 22 may comprise and implement a fly height control system. Control circuitry 22 measures fly height on a reserved track, a designated fly height measurement track, with a certain harmonic signal written thereto. The harmonic signal of the fly height measurement track is specialized for forming a readback signal measurement for determining and measuring fly height. RRO noise removal circuitry 30 of control circuitry 22 may use the same fly height measurement track to measure fly height change at different slider bias voltage points. Control circuitry 22 and RRO noise removal circuitry 30 may typically perform these two calibrations closely to each other. Since the RRO noise components per sector as detected by RRO noise removal circuitry 30 in the sectors of the fly height measurement track are dependent on the revolution of the disks as driven by the spindle motor, they are the same per sector on other tracks, and RRO noise removal circuitry 30 can subtract the same RRO noise components per sector from various types of readback signal measurements for various purposes when operating the heads proximate to normal data tracks.

Fly height readback signal measurement typically has repeatable runout noise (RRO noise) due to predictably repeating electrical crossings per mechanical revolution of the spindle motor, and non-repeatable runout noise (NRRO noise). At the same time, since slider bias voltage change causes fly height change, fly height exhibits some ramping up times and ramping down times with certain timing constants. The timing constants have dependencies on the stiffness of the air bearing surface (ABS). Since RRO noise removal circuitry 30 already has a normal fly height measurement on the same fly height measurement track from shortly before slider bias voltage calibration, RRO noise removal circuitry 30 may detect and record the RRO noise components from the fly height readback signal measurement from the normal fly height calibration. RRO noise removal circuitry 30 may then deduct or remove the RRO noise components in the OSBV calibration.

For the OSBV calibration, RRO noise removal circuitry 30 may then define a slider bias voltage array ("SBV array") comprising a plurality of slider bias voltage values or points ("slider bias voltages") at a variety of values of slider bias voltage. The SBV array may maximize the fly height change around both sides of a balance point. RRO noise removal circuitry 30 may inject all the different slider bias voltages for a selected number of sectors (e.g., 20 to 30 sectors) and read the fly height for each of the different slider bias voltages in each of the different sectors. RRO noise removal circuitry 30 may perform the voltage injections and fly height readbacks within one single revolution or less, substantially more quickly than in conventional calibration techniques, in various examples.

After getting all the fly height data back, RRO noise removal circuitry 30 may perform post-processing of the fly height data. RRO noise removal circuitry 30 may compare the post-processed fly height data with a manufacturing process calibration to determine the timing constant of stiffness of the air bearing surface (ABS). RRO noise removal circuitry 30 may use this timing constant to determine how many sectors it should discount before calculating a stable fly height value for a certain slider bias voltage. For each slider bias voltage, RRO noise removal circuitry 30 may average across stable sectors. In such a manner, RRO noise removal circuitry 30 may determine a number (e.g., approximately 20 to 30 in some examples) of data set pairs of fly height and slider bias voltage. RRO noise removal circuitry 30 may then perform second order curve fitting, and determine the optimum slider bias voltage (OSBV) based on the second order curve fitting.

Figure 3A:
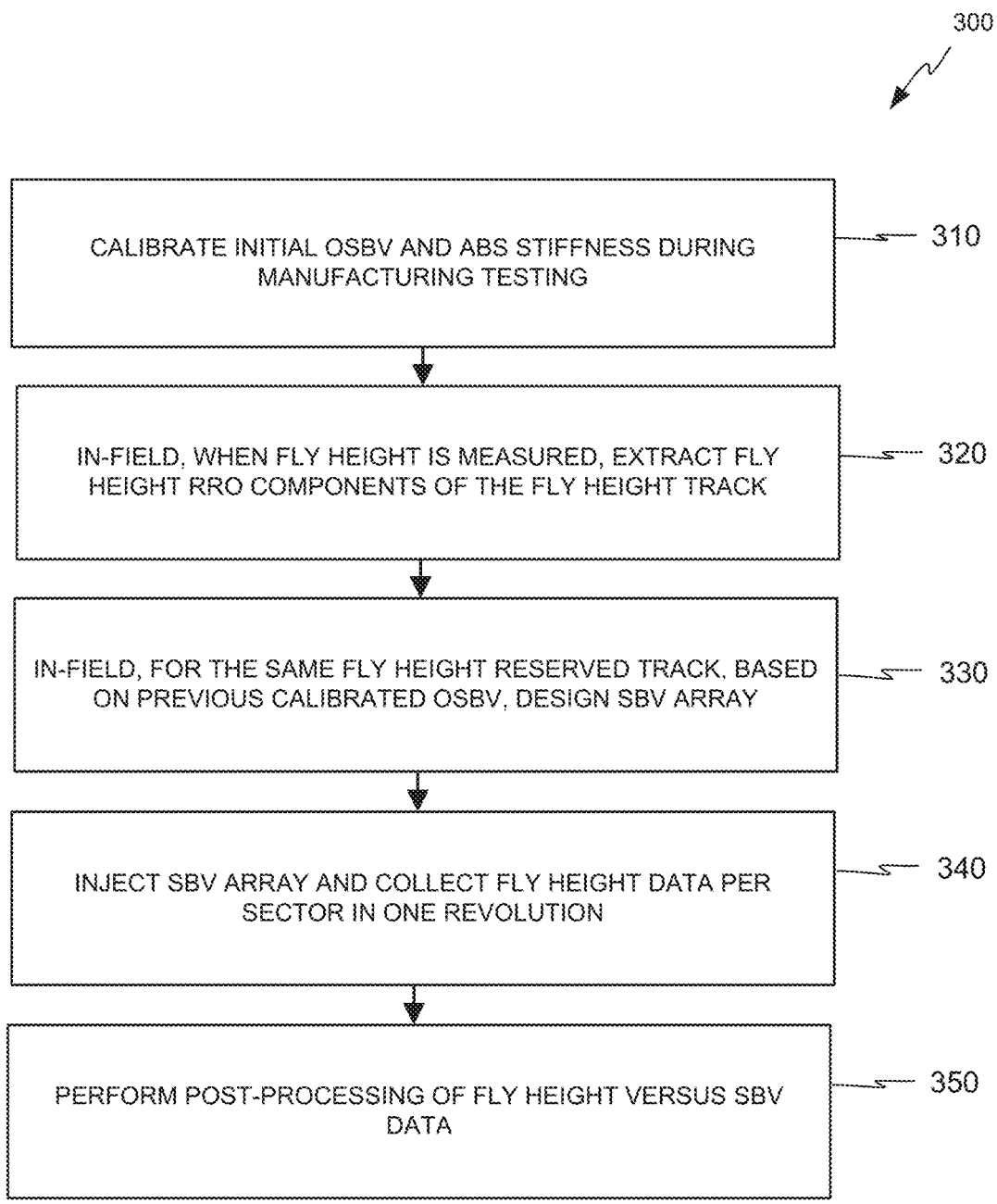
FIG. 3A depicts a flowchart of a method for RRO noise removal circuitry to perform RRO removal for the purpose of performing OSBV calibration, in accordance with aspects of the present disclosure.

FIG. 3A depicts a flowchart of a method 300 for RRO noise removal circuitry 30 to perform RRO removal for the purpose of performing OSBV calibration, in accordance with aspects of the present disclosure. As noted above, RRO noise removal circuitry 30 may calibrate initial OSBV and ABS stiffness during manufacturing testing (310) as part of the initial factory manufacturing process of disk drive 22. Subsequently, once disk drive 22 is deployed in-field in use by a host or user, when control circuitry 22 measures fly height of a given head 18 (e.g., every time or some of the times control circuitry 22 measures fly height, in various examples), RRO noise removal circuitry 30 detects and extracts the RRO noise components of the fly height from the fly height measurement track readback signal measurements (320).

RRO noise removal circuitry 30 may then define or design an SBV injection array, for the same reserved or designated fly height measurement track, and based on the previously calibrated OSBV (330). RRO noise removal circuitry 30 may then inject the SBV array via the control channel to head 18, and collect per-SID fly height data corresponding to the injected SBV array in a single revolution of disks 16 (340). In other words, RRO noise removal circuitry 30 collects fly height per SBV/per-SID data. RRO noise removal circuitry 30 may then perform post-processing of fly height per SBV data (350), as shown in further detail in FIG. 3B.

Figure 3B:
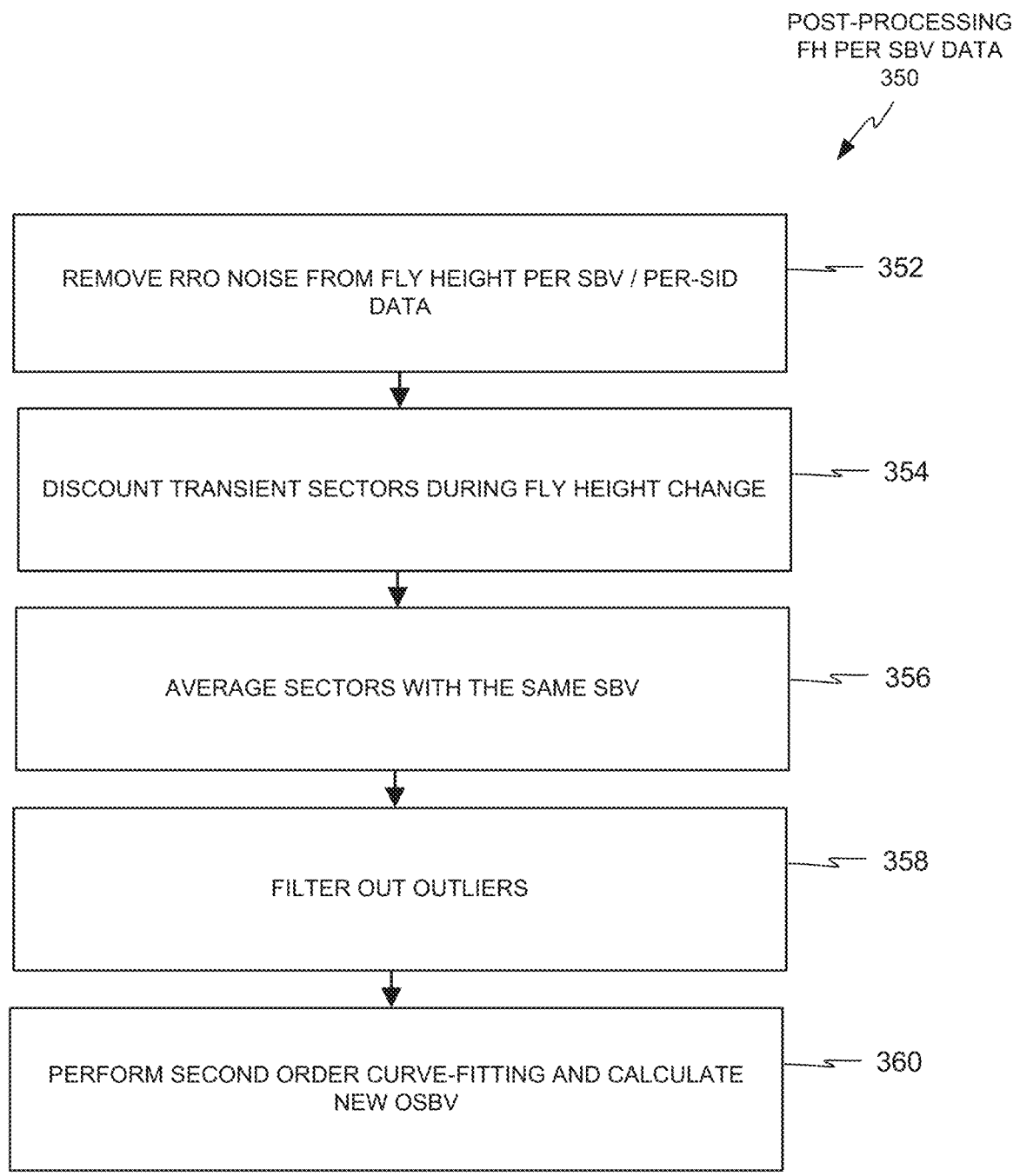
FIG. 3B depicts a flowchart of a method for RRO noise removal circuitry to perform post-processing of fly height per SBV data and determine a new OSBV, as part of performing RRO removal for the purpose of performing OSBV calibration, in accordance with aspects of the present disclosure.

FIG. 3B depicts a flowchart of a method 350 for RRO noise removal circuitry 30 to perform post-processing of fly height per SBV data and determine a new OSBV, as part of performing RRO noise removal for the purpose of performing OSBV calibration, in accordance with aspects of the present disclosure. As part of method 350, RRO noise removal circuitry 30 may remove RRO noise from the fly height per SBV/per-SID data (352). RRO noise removal circuitry 30 may further discount transient sectors during fly height change (354). RRO noise removal circuitry 30 may further average sectors with the same SBV (356). RRO noise removal circuitry 30 may further filter out outliers in the data (358). RRO noise removal circuitry 30 may further perform second-order curve-fitting and calculate the new OSBV based on the second-order curve-fitting (360). Thus, by performing methods 300 and 350, RRO noise removal circuitry 30 may accurately and effectively determine a new OSBV for maintaining head 18 at nominal or optimal fly height, in various examples.

Figure 4:
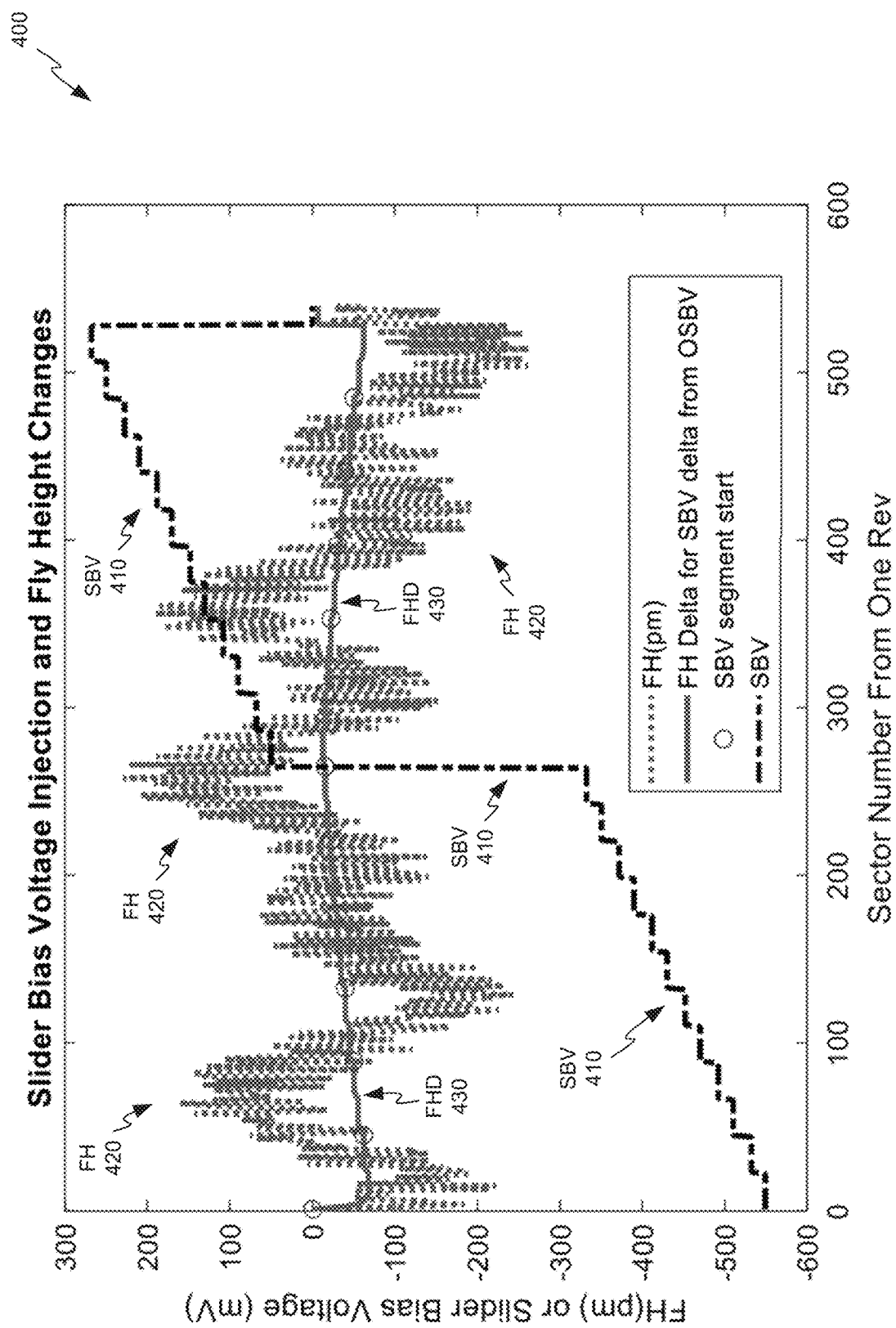
FIG. 4 depicts a graph of slider bias voltage and fly height during an algorithmic process of RRO noise removal circuitry performing slider bias voltage injection, in accordance with aspects of the present disclosure.

FIG. 4 depicts a graph 400 of slider bias voltage and fly height during an algorithmic process of RRO noise removal circuitry 30 performing slider bias voltage injection, in accordance with aspects of the present disclosure. Graph 400 shows both fly height (FH) and SBV along the y-axis, with respect to disk surface sectors on the x-axis, over one single revolution of the disk. Graph 400 depicts injected SBV values 410 of the SBV array defined and injected by RRO noise removal circuitry 30, across the sectors of the disk surface. As depicted, RRO noise removal circuitry 30 injects the SBV with substantially varying values across the sectors, in a step function with 12 substantially low values, relative to nominal SBV, across the first half of the disk, and then skipping upward to 12 substantially high values, relative to nominal SBV, across the second half of the disk. Graph 400 further depicts fly height 420 as detected via fly height readback signal measurements, which are strongly impacted by RRO noise, such that they tend not to accurately indicate true fly height. Graph 400 further depicts fly height delta 430, which is a delta or difference away from optimal fly height, and is indicative of a delta of SBV away from OSBV. Aspects of this SBV injection, RRO noise removal, and OSBV determination process are further described as follows.

Figure 5:
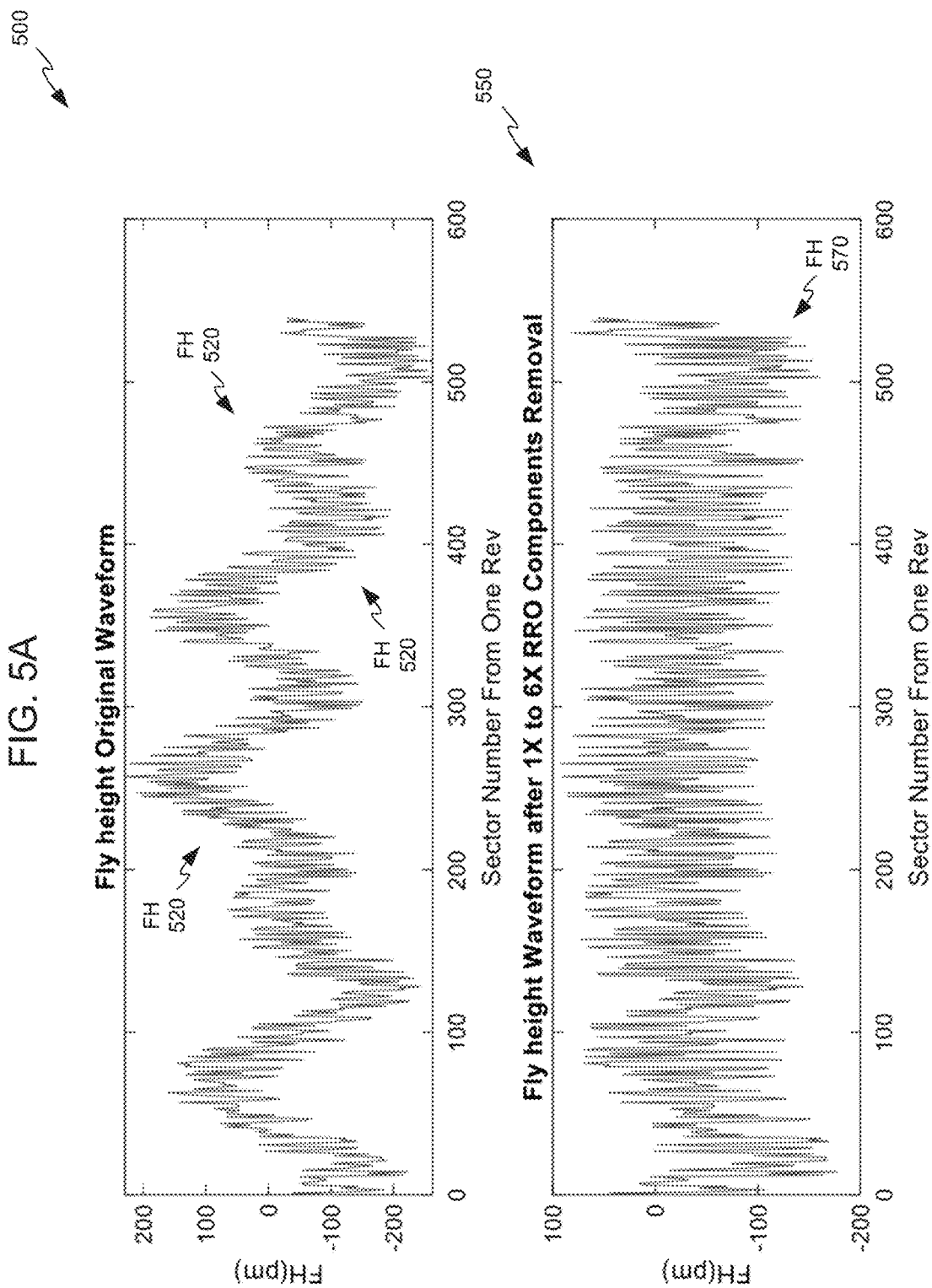
FIG. 5A depicts a graph of an original fly height waveform, in accordance with aspects of the present disclosure.
FIG. 5B depicts a graph of a fly height waveform after RRO noise removal circuitry performs a 1× to 6×RRO noise components removal, in accordance with aspects of the present disclosure.

FIG. 5A depicts a graph 500 of an original fly height waveform 520, in accordance with aspects of the present disclosure. Graph 500 again shows fly height on the y-axis relative to a complete track of sectors around one full disk revolution on the x-axis. Original fly height waveform 520 corresponds to fly height 420 as detected via fly height readback signal measurements as described above with reference to FIG. 4. Original fly height waveform 520 is in its original form as read by readback signal measurement, and is substantially affected by RRO noise, which may overwhelm the true fly height signal or otherwise substantially degrade the fly height signal-to-noise ratio (SNR).

FIG. 5B depicts a graph 550 of a fly height waveform 570 after RRO noise removal circuitry 30 performs a 1× to 6×RRO noise components removal, in accordance with aspects of the present disclosure. The 1× to 6×RRO noise components are due to 1 to 6 electrical crossings per mechanical revolution of the spindle motor. Graph 550 again shows fly height on the y-axis relative to a complete track of sectors around one full disk revolution on the x-axis. Graph 550 is depicted on an expanded scale on the fly height y-axis relative to graph 500 of FIG. 5A, such that it exaggerates remaining variation in the signal for fly height 570 relative to the signal for fly height 520 with RRO noise as depicted in FIG. 5A. With that in mind, FIG. 5B shows that, by detecting and removing the 1× to 6×RRO noise components, RRO noise removal circuitry 30 removes a great deal of the noise and variation in the fly height signal. RRO noise removal circuitry 30 particularly removes most of the larger-scale noise variation from one group of sectors to another over the course of the track. By detecting and removing the 1× to 6×RRO noise components, RRO noise removal circuitry 30 is enabled to gauge fly height accurately and to perform rapid, accurate, in-field, on-the-fly calibration of OSBV.

Figure 6:
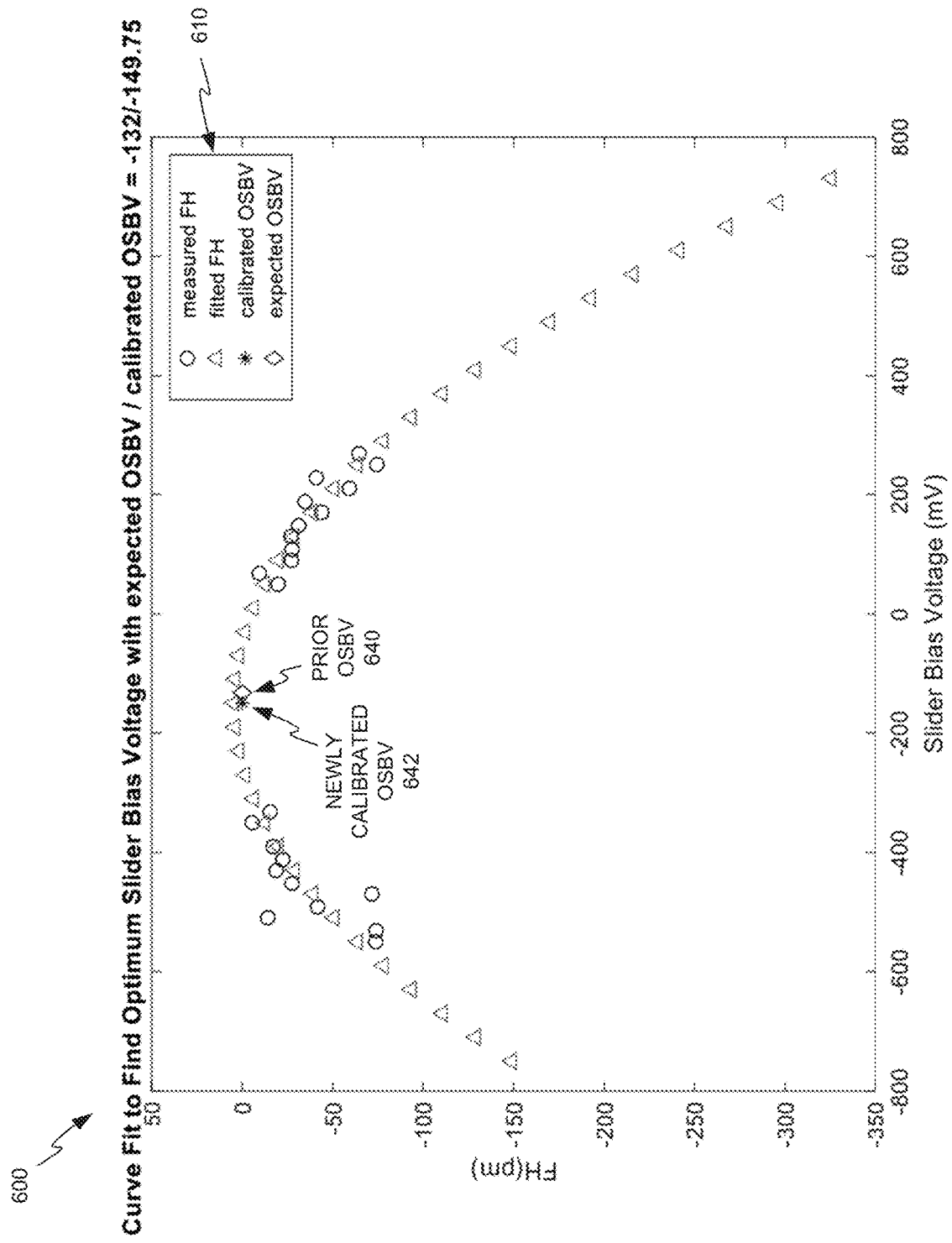
FIG. 6 depicts a graph of RRO noise removal circuitry calculating and determining optimum slider bias voltage (OSBV) with second-order curve fitting, in accordance with aspects of the present disclosure.

FIG. 6 depicts a graph 600 of RRO noise removal circuitry 30 calculating and determining optimum slider bias voltage (OSBV) with second-order curve fitting, in accordance with aspects of the present disclosure. Graph 600 shows fly height on the y-axis relative to SBV along the x-axis. As indicated in the legend 610, detected measured values of fly height per SBV data points ("fly height per SBV data points") are shown as circles. There are two groupings each with 12 fly height per SBV data points, corresponding to each of the 12 SBV step values in each of the two step function sections on either side of graph 400 in FIG. 4. Those 24 fly height per SBV data points provide a statistically rich basis for RRO noise removal circuitry 30 performing a second-order curve-fitting for the fly height per SBV. The resulting calculation and determination by RRO noise removal circuitry 30 of the general, newly calibrated relation of fly height per SBV, resulting from RRO noise removal circuitry 30 calculating the second-order curve-fitting, is depicted in graph 600 as the parabolic curve of triangles, as indicated in legend 610.

In the example depicted in FIGS. 4 and 6, using an SBV array with 12 values on either side, with the SBV values substantially low and substantially high relative to nominal SBV, those substantially deviating SBV values return the 24 fly height per SBV data points as depicted in FIG. 6, are substantially displaced from the center of the parabolic curve of the determined newly calibrated relation of fly height per SBV, and are substantially along the two arms of the parabolic curve of the determined newly calibrated relation of fly height per SBV. By selecting substantially deviating values of SBV (i.e., substantially low and substantially high relative to nominal SBV) as part of defining and injecting the SBV array, RRO noise removal circuitry 30 may yield resulting data, in the form of the fly height per SBV data points, that have greater information value than if RRO noise removal circuitry 30 were to selected SBV values close to nominal, where the curvature of the fly height per SBV is lesser and is relatively flat. On the other hand, if RRO noise removal circuitry 30 were to selected SBV values relatively much farther from nominal, this would likely invoke more complex effects that would rarely if ever come into play or have relevance in operation, and escape the assumptions and simplifications that are safe to make within a small range around nominal. So, such farther from nominal values would also not be as helpful in accurately determining and newly calibrating the fly height per SBV relation in and around the nominal range.

RRO noise removal circuitry 30 may thus take a variety of factors into account in selecting a portfolio of SBV values with high or optimized information return as part of defining the SBV array for injection. These various factors may be summarized in that RRO noise removal circuitry 30 may select a range of values of SBV that span a substantial range of values of voltage of a nominal range of SBV, or that span a substantial range of values of voltage that both intersect and extend somewhat (though not too far) beyond a nominal range of values of SBV, in various examples.

In other examples, RRO noise removal circuitry 30 may define and inject SBV arrays with 5, 10, 20, 30, 40, 50, or any other numbers of SBV values. In other examples, RRO noise removal circuitry 30 may perform curve-fitting to first, third, fourth, fifth, sixth, seventh, or other orders, and with any technique of curve-fitting or any other type of technique.

FIG. 6 also depicts the original or prior or expected OSBV 640, and the newly calibrated OSBV 642 resulting from RRO noise removal circuitry 30 detecting and removing RRO noise and performing the OSBV calibration process as described above. While the two OSBV values do not appear far apart on the scale of graph 600, the newly calibrated OSBV is approximately 13% higher voltage in this example, and may analogously be significantly different than the originally or previously calibrated OSBV in other examples.

By enabling performance of such a more accurate OSBV, RRO noise removal circuitry 30 enables control circuitry 22 to maintain head 18 at nominal or optimal fly height more accurately and effectively. Such maintaining head 18 at nominal or optimal fly height more accurately and effectively by RRO noise removal circuitry 30 thereby enables disk drive 15 to operate more accurately, more quickly, and with superior performance across a range of desirable performance criteria.

In various other examples, RRO noise removal circuitry 30 provides a range of other inventive advantages by deploying the results of detecting and removing per-SID RRO noise from readback signal measurements across a variety of other functions. These illustratively include removing RRO noise from laser power readback signal measurements in HAMR heads to achieve newly precise control of the lasers; removing RRO noise from overwrite measurement readback signal measurements to perform newly precise overwrite measurement; and removing RRO noise from sputter shadow amplitude readback signal measurements to achieve new levels of precision in magnetron sputter thin film deposition in the manufacturing process.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface among the one or more disks; and
   one or more processing devices configured individually or in combination to:
      detect repeatable runout (RRO) noise components from a measurement of fly height of the selected head above one or more sectors of a fly height measurement track; and
      remove the detected RRO noise components from one or more per-sector readback signal measurements.

2. The data storage device of claim 1, wherein the one or more per-sector readback signal measurements comprise slider bias voltage (SBV) measurements, and wherein the one or more processing devices are configured to remove the RRO noise components from the SBV measurements.

3. The data storage device of claim 2, wherein the one or more processing devices are further configured to:
   define an SBV array of various values of SBV, based on a previously calibrated value of an optimal slider bias voltage (OSBV);
   inject the SBV array to a control signal of the selected head during the measurement of the fly height of the selected head above a plurality of the sectors of the fly height measurement track; and
   collect per-sector fly height data in relation to the values of SBV of the SBV array.

4. The data storage device of claim 3, wherein the one or more processing devices are further configured to:
   curve-fit the per-sector fly height data in relation to the values of SBV of the SBV array to a second-order function; and
   determine a newly calibrated OSBV based on the second-order function curve-fitted to the per-sector fly height data in relation to the values of SBV of the SBV array.

5. The data storage device of claim 3, wherein the one or more processing devices are further configured to collect the per-sector fly height data within a single revolution of the one or more disks.

6. The data storage device of claim 3, wherein the one or more processing devices are further configured to discount transient sector data during fly height change due to change in the values of SBV and based on stiffness of an air-bearing surface (ABS) of the selected head.

7. The data storage device of claim 3, wherein the one or more processing devices are further configured to average data from sectors with the same value of SBV.

8. The data storage device of claim 2, wherein the one or more processing devices are further configured to select a range of values of SBV that span a substantial range of values of voltage of a nominal range of SBV.

9. The data storage device of claim 2, wherein the one or more processing devices are further configured to select a range of values of SBV that span a range of values of voltage that both intersect and extend beyond a nominal range of values of SBV.

10. The data storage device of claim 1, wherein the one or more processing devices being configured to detect the RRO noise components comprises the one or more processing devices being configured to detect 1X to 6X RRO noise components, and
wherein the one or more processing devices being configured to remove the detected RRO noise components from the one or more per-sector readback signal measurements comprises the one or more processing devices being configured to remove the 1× to 6× RRO noise components from the one or more per-sector readback signal measurements.

11. The data storage device of claim 1, wherein the one or more per-sector readback signal measurements comprise overwrite measurements, and wherein the one or more processing devices are configured to remove the RRO noise components from the overwrite measurements.

12. The data storage device of claim 1, wherein the one or more per-sector readback signal measurements comprise laser power measurements of a heat-assisted magnetic recording (HAMR) laser unit comprised in the selected head, and wherein the one or more processing devices are configured to remove the RRO noise components from the laser power measurements.

13. The data storage device of claim 1, wherein the one or more per-sector readback signal measurements comprise magnetron sputter shadow amplitude measurements, and wherein the one or more processing devices are configured to remove the RRO noise components from the magnetron sputter shadow amplitude measurements.

14. A method comprising:
detecting, by one or more processing devices individually or in combination, repeatable runout (RRO) noise components from a measurement of fly height of a selected head of a data storage device above one or more sectors of a fly height measurement track of a corresponding disk surface among one or more disks of the data storage device; and
removing, by the one or more processing devices, the detected RRO noise components from one or more per-sector readback signal measurements.

15. The method of claim 14, wherein the one or more per-sector readback signal measurements comprise slider bias voltage (SBV) measurements, the method further comprising:
removing the RRO noise components from the SBV measurements.

16. The method of claim 15, further comprising:
defining an SBV array of various values of SBV, based on a previously calibrated value of an optimal slider vias voltage (OSBV);
injecting the SBV array to a control signal of the selected head during the measurement of the fly height of the selected head above a plurality of the sectors of the fly height measurement track;
collecting per-sector fly height data in relation to the values of SBV of the SBV array;
curve-fitting the per-sector fly height data in relation to the values of SBV of the SBV array to a second-order function; and
determining a newly calibrated OSBV based on the second-order function curve-fitted to the per-sector fly height data in relation to the values of SBV of the SBV array.

17. The method of claim 14, wherein the one or more per-sector readback signal measurements comprise overwrite measurements, laser power measurements, or magnetron sputter shadow amplitude measurements; and
wherein the one or more processing devices are configured to remove the RRO noise components from the overwrite measurements, the laser power measurements, or the magnetron sputter shadow amplitude measurements.

18. One or more processing devices individually or in combination comprising:
means for detecting repeatable runout (RRO) noise components from a measurement of fly height of a selected head of a data storage device above one or more sectors of a fly height measurement track of a corresponding disk surface among one or more disks of the data storage device; and
means for removing the detected RRO noise components from one or more per-sector readback signal measurements.

19. The one or more processing devices of claim 18, wherein the one or more per-sector readback signal measurements comprise slider bias voltage (SBV) measurements, the one or more processing devices further comprising:
means for removing the RRO noise components from the SBV measurements;
means for defining an SBV array of various values of SBV, based on a previously calibrated value of an optimal slider vias voltage (OSBV);
means for injecting the SBV array to a control signal of the selected head during the measurement of the fly height of the selected head above a plurality of the sectors of the fly height measurement track;
means for collecting per-sector fly height data in relation to the values of SBV of the SBV array;
means for curve-fitting the per-sector fly height data in relation to the values of SBV of the SBV array to a second-order function; and
means for determining a newly calibrated OSBV based on the second-order function curve-fitted to the per-sector fly height data in relation to the values of SBV of the SBV array.

20. The one or more processing devices of claim 18, wherein the one or more per-sector readback signal measurements comprise overwrite measurements, laser power measurements, or magnetron sputter shadow amplitude measurements, the one or more processing devices further comprising:
means for remove the RRO noise components from the overwrite measurements, the laser power measurements, or the magnetron sputter shadow amplitude measurements.

* * * * *